J S Roberts
INVENTOR.

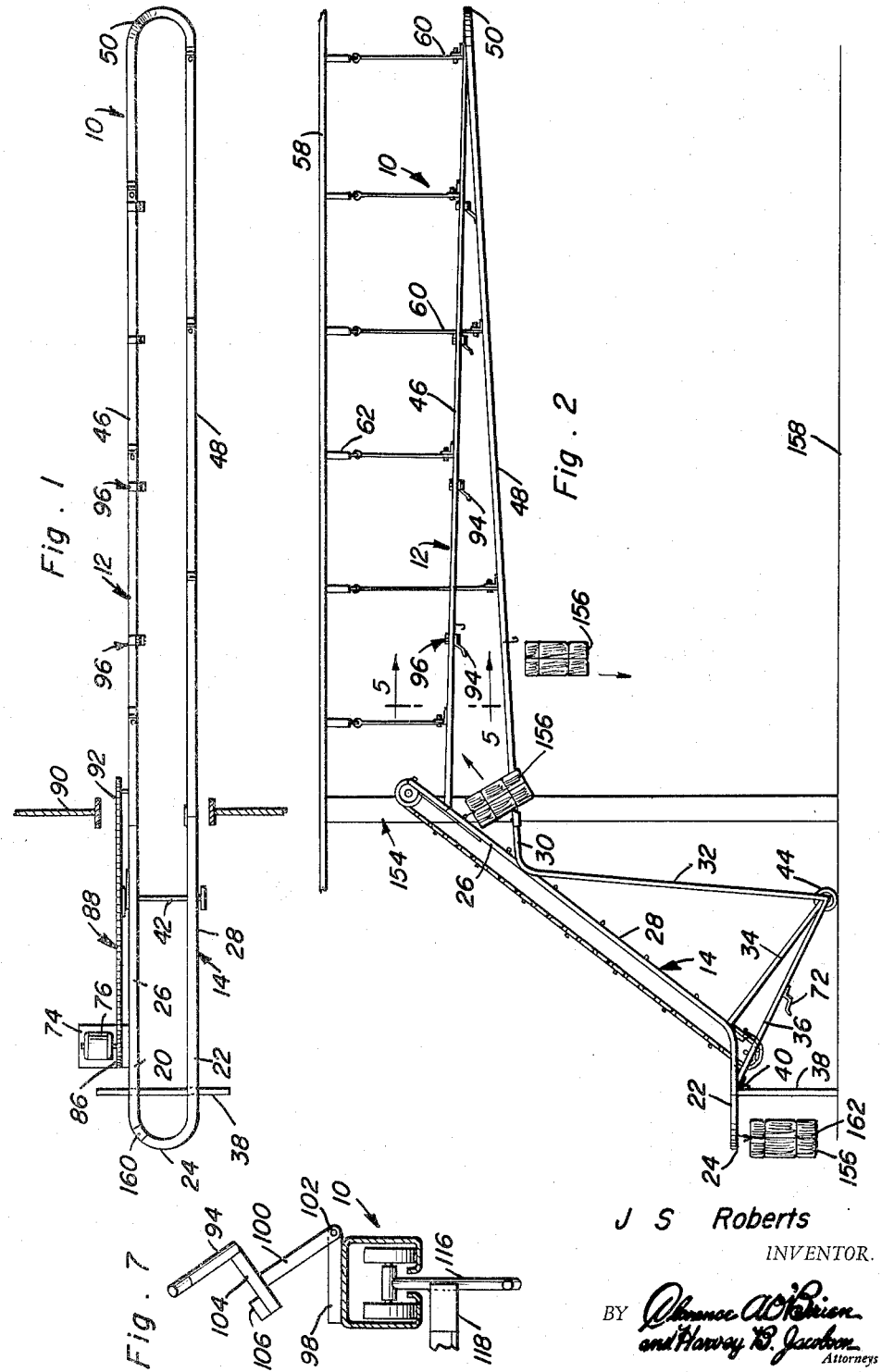

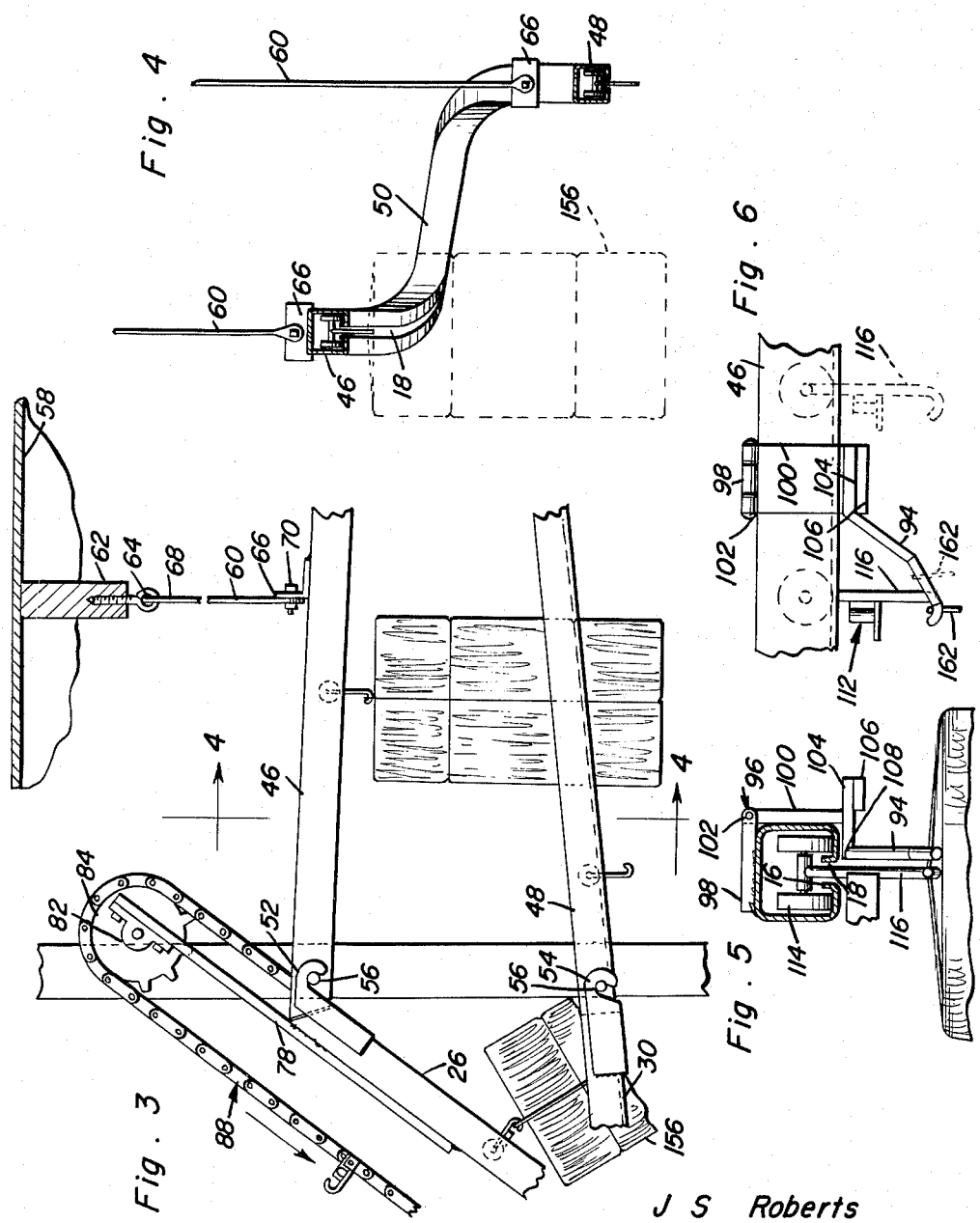

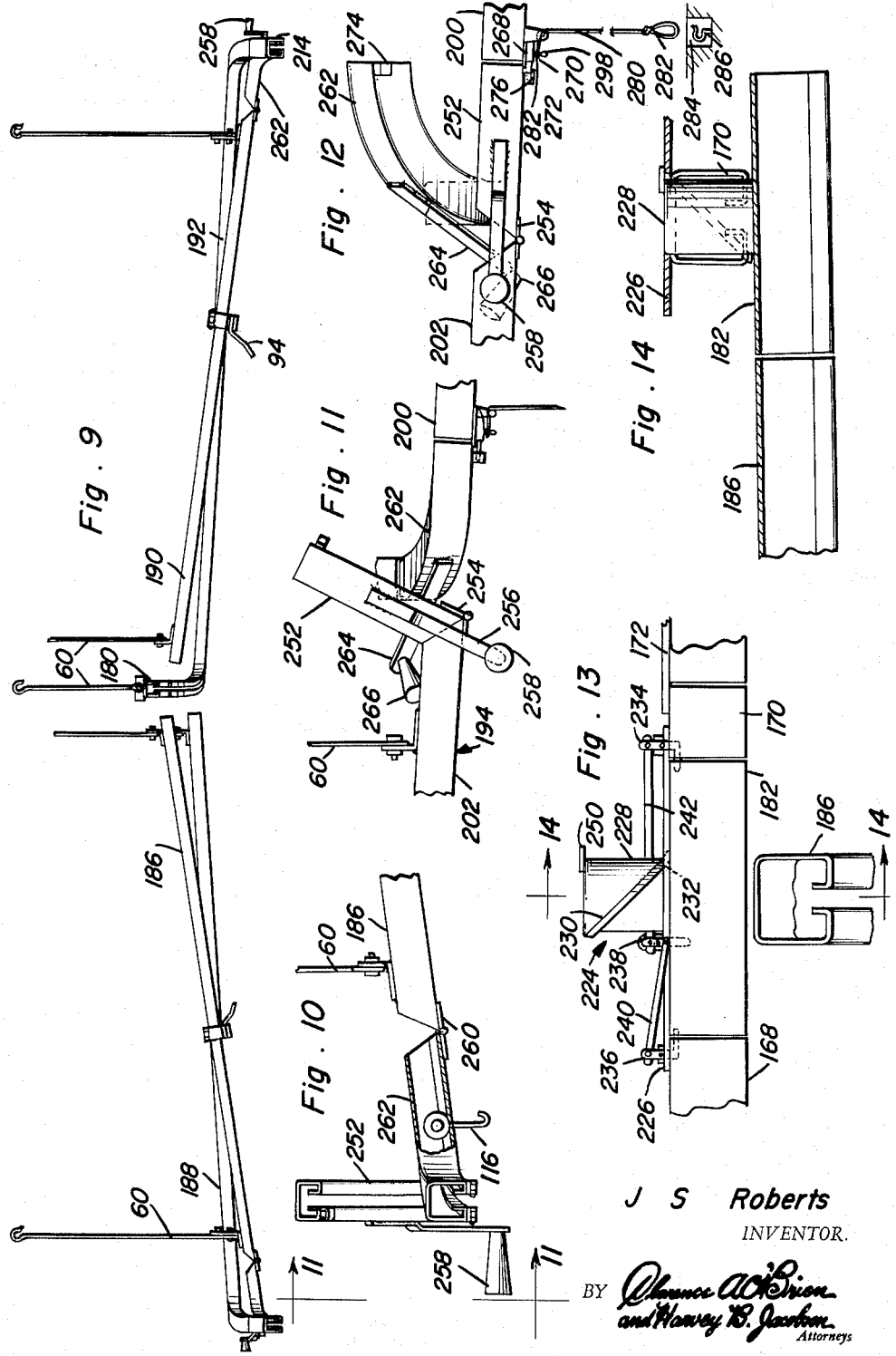

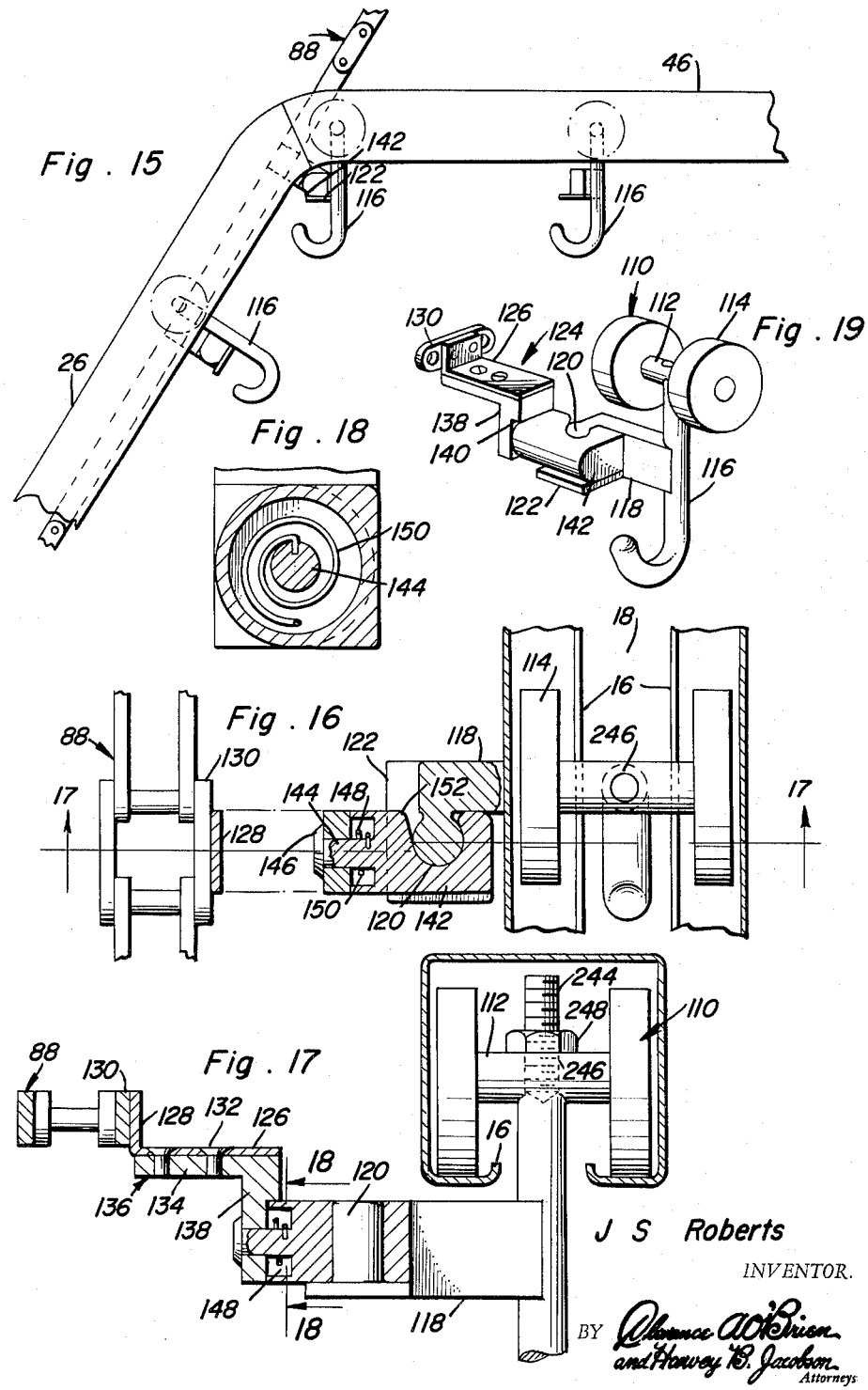

United States Patent Office 3,209,896
Patented Oct. 5, 1965

3,209,896
MONORAIL CONVEYOR SYSTEMS
J S Roberts, Bristol, Va.
(Grove Park Drive, Bristol, Tenn.)
Filed May 1, 1962, Ser. No. 191,525
13 Claims. (Cl. 198—177)

This invention relates to conveyors, and more particularly to a conveyor adapted to automatically convey and unload bales of hay, feed, or other substances into the loft of a barn or into other building structures so that the substance unloaded in the building will be evenly distributed over the floor thereof.

Accordingly, it is a primary object of the invention to provide an improved conveyor system for more efficiently and more rapidly conveying into and filling a loft or building structure with bales of hay or other substances.

It is another object of the invention to provide an improved conveyor for automatically filling a building or loft of a building with hay or other substances in such a manner that the substance with which the building is filled is evenly distributed over the floor thereof so that the entire volume of the building may be utilized for storage.

It is another object of the invention to provide an improved conveyor device or system which is primarily operated by the force of gravity.

It is another object of the invention to provide a conveyor system using trolleys movable on a monorail and including means for automatically removing cargo from the trolleys, dropping the cargo onto the floor of a building, returning the trolleys automatically by gravity to a loading area outside of the building whereupon the trolleys are available for further loading or filling the building.

It is another object of the invention to provide a monorail conveying system having an elevated portion removably supported on the roof or ceiling of a building and an inclined section detachably secured to or having a portion removably connected to the elevated portion and mounted on wheels so that the inclined portion may be disconnected and easily transported away from the building when not in use.

It is another object of the invention to provide a conveyor system of relatively simple design and therefore economical to manufacture and maintain.

It is another object of the invention to provide a conveying system that may be used not only for loading a building, but may be reversely mounted for unloading the building.

It is another object of the invention to provide a conveyor system which will load and unload a building or a part thereof without removing any parts or adding any parts to the system and which may be operated by only one man.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of a simplified form of the invention showing it installed so as to load a building;

FIGURE 2 is a side elevational view of the device shown in FIGURE 1;

FIGURE 3 is an enlarged side elevational view of a portion of the device shown in FIGURE 2;

FIGURE 4 is an enlarged vertical cross-sectional view taken substantially on the plane of line 4—4 in FIGURE 3;

FIGURE 5 is an enlarged vertical cross-sectional fragmentary view taken through a portion of the conveyor track upon the plane indicated by the section line 5—5 of FIGURE 2 and illustrating how the pickup arm on the track disconnects a load from a trolley on the track;

FIGURE 6 is a side elevational view of the conveyor structure shown in FIGURE 5;

FIGURE 7 is a vertical cross-sectional view similar to FIGURE 5 but showing a pickup arm in retracted position;

FIGURE 9 is an enlarged vertical cross-sectional view taken substantially on the plane of line 9—9 in FIGURE 8;

FIGURE 10 is an enlarged vertical cross-sectional view taken substantially on the plane of line 10—10 in FIGURE 8;

FIGURE 11 is a side elevational view taken substantially on the plane of line 11—11 in FIGURE 10;

FIGURE 12 is a side elevational view similar to FIGURE 11 but showing portions of the track switching mechanism in different positions;

FIGURE 13 is an enlarged elevational view taken substantially on the plane of line 13—13 in FIGURE 8 showing certain details of the track drop switch;

FIGURE 14 is a vertical cross-sectional view taken substantially on the plane of line 14—14 of FIGURE 13 but with certain details omitted;

FIGURE 15 is an enlarged elevational view of a portion of the track shown in FIGURE 3;

FIGURE 16 is an enlarged plan view of a portion of the structure shown in FIGURE 15 with portions thereof broken away;

FIGURE 17 is a cross-sectional view through the track and chain shown in FIGURE 15 and is taken substantially upon the plane indicated by the section line 17—17 of FIGURE 16;

FIGURE 18 is an enlarged cross-sectional view taken substantially on the plane of the line 18—18 in FIGURE 17; and FIGURE 19 is a perspective view of one of the trolleys and a portion of the mechanism for connecting the trolley to the driving chain shown in FIGURES 15–17.

Figure 8:
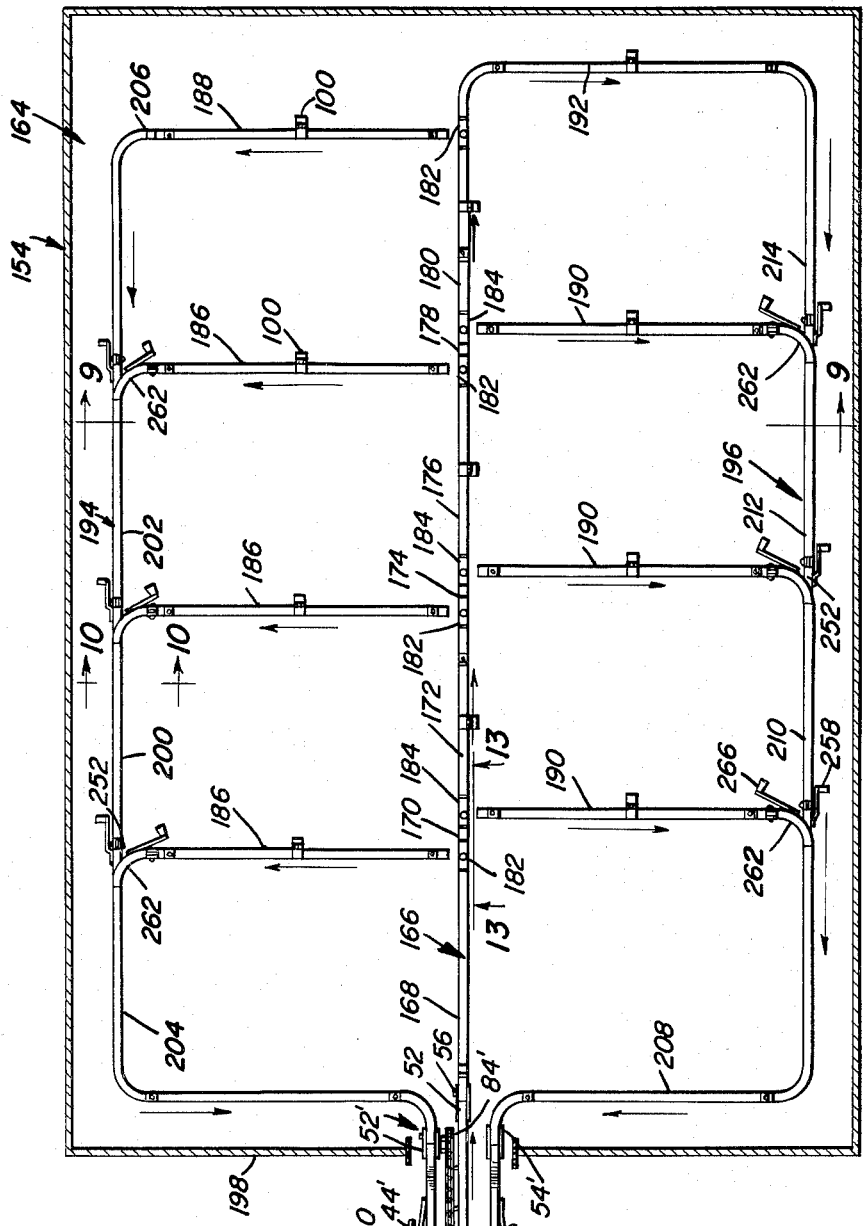
FIGURE 8 is a plan view of a more complicated form of the invention.

Referring particularly to FIGURES 1–7, it can be seen that one form of the monorail conveyor system comprises an oval shaped track or rail 10 including two U-shaped sections 12 and 14 as shown in FIGURE 1. The two U-shaped sections are connected releasably by hook means as shown in FIGURE 3. As shown in FIGURES 4 and 5, the entire track 10 is of hollow construction and of rectangular cross section. The center of the bottom wall of the rail is slit and the portions of the bottom wall adjacent the slit are deflected upwardly 90° to form flanges 16 and an elongated slot 18 in the bottom of the track.

The forward U-shaped track section 14 is of one-piece construction and includes two spaced parallel horizontal legs 20 and 22 connected by a semi-circular horizontal section 24. The rear ends of the legs 20 and 22 are integrally connected to the forward and bottom ends of upwardly sloping leg extensions 26 and 28. The upper end portion of the leg extension 28 is deflected downwardly substantially horizontally to form an end connection 30.

As shown in FIGURE 2, the upper end of each of the leg extensions 26 and 28 are connected to the upper end of a downwardly extending strut 32. The bottom end of the strut 32 is connected to the bottom ends of sloping struts 34 and 36. The upper ends of the struts 34 and 36 are connected to the legs 20 and 22. A vertically extending support plate 38 supports the central portion of the legs 20 and 22 and is connected thereto by means of a hinge 40 which has pivoted wings connected to the support plate and the struts 36 as shown in FIGURE 2. An axle 42 extends between and connects the lower ends of the six struts 32, 34 and 36. A wheel 44 is rotatably journaled on each end of the axle 42.

As shown in FIGURES 1–3, the U-shaped section 12 comprises two reversely sloping legs 46 and 48 disposed in side-by-side relation and connected by a semicircular downwardly inclined bight portion 50. The leg 46, as seen best in FIGURE 3, slopes downwardly and rearwardly from the leg extension 26 to the bight portion 50 and the leg 48 slopes downwardly and forwardly from the bight portion 50 to the end connection 30. The leg extension 26 and the end connection 30 of the track 10 are each provided with a pair of hooks 52 and 54 welded to opposite sides thereof. The forward ends of the legs 46 and 48 have short pins 56 secured to and projecting from opposite sides thereof. As shown in FIGURE 3, the hooks 52 and 54 are engageable over the pins 56 for securing the U-shaped sections 12 and 14 releasably together.

The track section 12 is supported on the roof or ceiling 58 of a building or loft by means of a plurality of vertical rods 60. The roof of the building is normally supported by a plurality of parallel rafters or joists 62. A plurality of eyebolts 64 are threaded into the rafters and a plurality of L-shaped brackets 66 are welded to the upper surfaces of the legs 46 and 48. Each rod 60 is provided with a hook 68 at its upper end which extends through the loop of an eyebolt 64 and the bottom of each rod is formed into a circular loop which receives a bolt 70 extending through an aperture in the bracket 66 and secured in position by a conventional nut.

When the conveyor is not in use, the section 14 may be disconnected from the section 12 by unhooking the hooks 52 and 54 from the pins 56 and folding the support plate 38 adjacent the struts 36. A latch 72 is pivoted to one of the struts 36 so that it may be pivoted over the bottom edge of the plate 38 for securing it parallel to the struts 36. The track section 14 may then be rolled away on its wheels 44. The track section 12 is normally left in position even when not being used, but may be removed merely by unhooking the hooks 68 from the eyebolts 64.

A support plate 74 is connected in a horizontal position to the outer side of the leg 20 of the track section 14 and supports a prime mover such as an electric motor 76. As shown in FIGURE 3, a flat support plate 78 is connected to the top surface of the leg extension 26 and projects upwardly there beyond. The upper end of the plate 78 has a conventional pillow block 82 secured thereto. One end of a shaft is rotatably supported in the pillow block and the other end of the shaft is secured to the center of a chain sprocket 84. A chain sprocket 86 coplanar with the sprocket 84 is rotatably supported on the driving shaft of the motor 76, and a conventional link-type chain 88 is encircled around the sprockets 84 and 86.

One end of the roof or ceiling 58 is supported on a front wall 90 which has an entrance opening 92 therein.

A plurality of pickup arms 94 are mounted on the rail section 12. As illustrated in FIGURES 1 and 2, four pickups arms 94 are mounted on the leg 46. Each pickup arm, see FIGURES 5 and 6, is supported on a hinge 96 comprising a pair of leaves 98 and 100 pivoted together by a pivot pin 102. Each leaf 98 is welded to the top of the track 10 and the free edge of each leaf 100 is connected to the center of a plate 104 provided with a counterweight 106 on one edge and the other edge thereof is connected to a horizontal portion 108 of the pickup arm 94. As shown in FIGURE 6, the pickup arm 94 slopes downwardly and forwardly from the plate 104.

As shown in FIGURES 15–19, a plurality of trolleys or carriers 110 are rotatable in track 10. Each trolley 110 comprises a horizontal axle 112 having a wheel 114 rotatably journaled on each of its ends. Each of the wheels 114 is rotatable on a rail of the track 10 defined between one of the flanges 16 and one side wall of the track. The upper end of a hook 116 is secured to the center of the axle 112 and at right angles thereto. An L-shaped arm 118 is connected to the central portion of the stem of the hook 116 and projects laterally from one side thereof towards the chain 88. Each of the L-shaped arms terminate in a vertical flange provided with a cylindrical leading edge 120. The bottom of the cylindrical leading edge 120 is connected to a rectangular plate 122 which is perpendicular to the axis of the cylindrical leading edge and the forward portion of the plate is also connected to the bottom surface of the arm 118.

The chain 88 is provided with a plurality of pushers 124 which are secured to one side of the chain and project laterally therefrom towards the rail 10. Each pusher comprises a flat plate 126 terminating at one end in a vertically extending flange 128 which is riveted to a link 130 of chain 88. Plate 126 is secured by rivets 132 to the arm 134 of an L-shaped bracket 136. Bracket 136 also includes a vertical arm 138 having a rectangular recess in one face thereof so as to provide a shoulder 140. A driving lug 142 of U-shaped cross section is pivotally connected to the arm 138 by means of a pin 144 which is integral with the driving lug and extends through and is journaled in a bore in the vertical arm 138. Pin 144 is provided with a head 146 to prevent separation of the lug and arm 138. Lug 142 is also provided with an annular chamber 148 around the base of the pin 144. A coil spring 150 encircles the base of pin 144 and is located in the chamber 148. One end of the coil spring is connected to the arm 138 and the other end of the spring is connected to the lug 142. The spring is torsionally stressed so as to urge the lug 142 in a counterclockwise direction as viewed in FIGURE 19 and force the upper surface of the lug into abutment with the shoulder 140. The leading edge of the lug 142 is provided with a substantially semi-cylindrical recess 152. The entrance to the recess 152 may be slightly enlarged so as to effectively guide the cylindrical leading edge 120 into same.

The monorail conveyor system is particularly designed for conveying bales of hay 156 from the outside of the building 154 into the building and automatically dropping and dispersing the hay over the floor 158 of the building 154. Initially, there are a plurality of the trolleys or carriers 110 supported on the short leg 22 and semi-circular section 24 of the track section 14. A small portion of the top of the semi-circular section 24 may be cut away as shown in FIGURE 1 so as to provide an opening 160 for removing and installing the trolleys. In operation, the trolley nearest the motor 76 is loaded with a bale 156 by inserting the hook 116 of the trolley through or under the binding 162 of the bale as shown in FIGURES 2 and 3. The loaded trolley is then pushed along the leg 20 towards the motor 76 after the motor has been energized so as to move the chain 88 in a counterclockwise direction around the sprockets 84 and 86 as illustrated by the arrows in FIGURE 3. As soon as the trolley is moved adjacent the motor 76, one of the pushers 124 on the lower half of the chain engages the L-shaped arm 118 on the trolley. This causes the cylindrical leading edge 120 of the arm to be forced into the semi-cylindrical recess 152 of the pusher and the lug 142 to be supported on the rectangular plate 122 of the arm 118. The movement of the chain then causes the carrier to roll up the inclined leg 26 of the track section 14. When the carrier is midway between the two sprockets 84 and 86, the weight of the chain tends to cause it to sag. However, sagging of the chain is prevented since the lug 142 of the carrier 124 is positively supported on the flat plate 122 of the trolley. Also, due to the flexibility of the chain 88 and the pivotal mounting of the lug 142, the entire forward area of the cylindrical leading edge 120 has full bearing engagement with the surface of the cylindrical recess 152. Referring to FIGURE 15, it can be seen that when the trolley 116 reaches the upper end of the leg 26 it is forced onto the forward end of the leg 46 of track section 12 and thereby begins to move in a substantially horizontal direction while the chain 88 is still moving in an upward direction. This causes the hook 116 and its plate 122 to pivot in a clockwise direction. Since the lug 142 is being forced against the forward face of the cylindrical leading edge 120, the driving lug 142 is forced to rotate in a clockwise direction as viewed in FIGURE 15 with the arm 118 and plate 122 whereby full bearing contact is maintained between the cylindrical leading edge 120 and the surface of the arcuate recess 152. As the trolley 116 is pushed away from the upper end of the leg 26, the lug 142 at the same time is being forced by the chain 88 upwardly and away from the plate 122 until eventually the plate and leading edge 120 separate from the lug 142. Since the track leg 46 slopes downwardly towards the rear of the building 154, the trolley 116 and its load of hay thereon is moved by inertia and gravity down the leg 46 towards the rear of the building.

As shown in FIGURE 2, initially all of the pick-up arms 94 are pivoted to a downwardly projecting or operative position. Consequently, as illustrated in FIGURES 2 and 6, as soon as the loaded trolley moves adjacent to the first pick-up arm 94, the forward end of the arm projects under the binding (usually normally comprising wire or heavy rope). Due to the inertia of the bale 156, its binding 162 is forced upwardly on the first pick-up arm 94 as illustrated in dotted lines in FIGURE 6. As the binding moves upwardly on the pick-up arm 94, it is lifted off of the hook 116 whereupon the hook continues to move rearwardly from the pick-up arm as illustrated in dotted lines in FIGURE 6. After the binding 162 moves a substantial distance up the arm 94, its movement is stopped by friction and gravity whereupon the forces of gravity then cause the bale and its binding 162 to slide downwardly and forwardly on the arm 94 whereupon the bale drops towards the floor 158 as illustrated in FIGURE 2. The unloaded trolley 112 than continues to move by gravity down the leg 46 around the arcuate bight portion 50 and then forwardly down the leg 48, onto the end connection 30, down the inclined leg 28 and back to its original starting position on the short leg 22. The process is repeated over and over until the forward portion of the building 154 is adequately filled, then the forward pick-up arm 94 is pivoted upwardly on top of the track out of operative position as illustrated in FIGURE 7 whereupon the second pick-up arm 94 directly behind the first pick-up arm then becomes operative to unload the hay in a central portion of the building. After the forward central portion of the building is adequately filled, then the rear pick-up arms are consecutively used until the entire building is filled with bales of hay. Of course, the various pick-up arms 94 may be individually used at any time desired and it is not necessary that the building be filled in the exact order described above. Also, by rearranging the various sections of the track 10 or using different shaped track sections, the conveyor system may also be used for unloading the building 154.

It is to be noted that once the driving lugs 142 on the pushers 124 separate from the leading edges 120 of the arms 118, the lugs are returned to their original position by the coil springs 150 whereupon the upper surfaces of the lugs are forced into abutting relationship with the shoulders 140.

After the building 154 is loaded with bales of hay, the U-shaped track section 14 is disconnected from the track section 12 merely by unhooking the hooks 52 and 54, folding up the support plate 38 and securing it adjacent to the strut 36 by latch 72, and then rolling away the section 14 on the wheels 44 for storage. The track section 12 may be removed if desired merely by unhooking the hooks 68 from the eyebolts 64.

A modified form of a monorail conveyor system is indicated at 164 in FIGURES 8–14. The system 164 is also installed in a rectangular building, barn or loft 154 similar or identical to the building 154 illustrated in FIGURES 1 and 2. The track 164 comprises a straight central section 166 which includes a plurality of short straight sections 168, 170, 172, 174, 178 and 180 all arranged in a straight line and spaced from one another and interconnected with each other by relatively short switch tracks 182 and 184. The forward end of the track piece 168 is connected to a vertically inclined track leg extension 26' similar to the leg extension 26 shown in FIGURES 1 and 3. Leg extension 26' has its upper end connected to the track piece 168 by a pair of hooks 52 identical to those shown in FIGURE 3. The central section 166 between the pieces 168 and 180 is secured closely adjacent the roof of the building 154 by hooked rods 60 as shown in FIGURES 3 and 9. The central track section 166 slopes downwardly from the hooks 52 towards the rear of the building at a slight angle. A plurality of laterally extending track pieces 186, 188, 190 and 192 extend laterally away from opposite sides of the central track section 166 and their outer ends terminate adjacent and in horizontal alignment with side track sections 194 and 196 generally parallel to the central track section 166 but sloping from the rear of the building 154 towards its front wall 198. The side track section 194 comprises a plurality of aligned straight track pieces 200 and 202 and a pair of L-shaped track pieces 204 and 206. The side track section 196 is a mirror image of the track section 194 and comprises pieces 208, 210, 212 and 214.

A plurality of track leg extensions 216 and 218 are connected to the forward ends of the L-shaped pieces 204 and 208 respectively and extend downwardly therefrom at a relatively steep angle generally parallel to the leg extension 26'. Preferably, the forward ends of the extensions 216 and 218 are each connected to the forward end of the extension 26' by horizontal U-shaped track pieces, not shown, similar to the track piece 24 shown in FIGURE 1.

The leg extensions 26', 216 and 218 are all rigidly connected together by a downwardly extending strut assembly 220 similar to the strut assembly shown in FIGURE 2. The strut assembly 220 is sufficiently braced by diagonal braces, not shown, and the bottom of the strut assembly is secured to a horizontal axle 42' which rotatably supports on its outer ends a pair of wheels 44'. A pair of sprockets 86' and 84' are rotatably supported on the leg extensions and encircled by an endless chain 88'. A motor or engine 222 is supported on the leg extension 216 and drives a sprocket in driving engagement with the chain 88'. The forward ends of the leg extensions 216, 218 and 26' are supported on a hinged support plate or brace 38'.

Referring to FIGURES 8, 13 and 14, it can be seen that the fixed straight track pieces comprising the elevated portion of the central track section 166 are spaced by a plurality of switch tracks 182 and 184. The switch tracks 182 and 184 operate automatically as fully disclosed in my Patent No. 3,022,745. As shown in FIGURE 8, the switch tracks 182 rotate counterclockwise in operation 90° so as to connect the central track section 166 with laterally extending track pieces 186 and 188, and the switch tracks 184 automatically pivot 90° in operation in a clockwise direction so as to connect the central track section 166 with the track pieces 190. Briefly, switch tracks 182 and 184 are operated by a drop switch mechanism 224 comprising a horizontally extending plate 226 extending between the tops of the adjacent spaced stationary track pieces. As illustrated in FIGURES 13 and 14, the plate 226 has its ends extending between and connected to the upper surfaces of the track pieces 168 and 170. The switch track 182 has a cylinder 228 fixed to its upper surface and extending through a circular bore in the plate 226. A spiral thread 230 is formed integrally with the outer surface of the cylinder 228 and mates with a short diagonal cam slot in the plate 226. A pair of L-shaped latches 234 and 236 are pivoted to the upper surfaces of the ends of the pieces 168 and 170. A latch pin 238 is pivoted to an ear on the upper surface of the switch track 182 adjacent the cylinder 228 and extends downwardly through an opening in the upper surface of the switch track into the interior thereof. The latch pin 238 is operatively connected to the latches 236 and 234 by generally horizontally extending links 240 and 242. The trolleys or carriers 110 used in the track system 164 are provided with adjustable lugs comprising threaded studs 244 (see FIGURE 17) threaded within a bore 246 extending through the center of the axle 112 of the carrier. Each lug 244 for each carrier is adjusted in its proper position and then locked in adjusted position by a locknut 248. In operation, when the carriers 110 move onto the selected switch track, the upper end of the stud 244 contacts the lower end of the latch pin 238 thereby pivoting the latch pin so as to pivot the L-shaped latches 236 and 234. The pivoting of the latches 236 and 234 releases the switch track 182 whereupon it may drop by gravity and under the weight of the trolley 110 away from the supporting track pieces 168 and 170. As the switch track 182 drops downwardly, the coaction between the spiral thread 230 and cam slot 232 causes the track to rotate 90° and into alignment with the laterally extending track piece 186. After the track switch 182 has rotated 90°, it is positively stopped by an adjustable stop 250. When the track switch 182 is connected with the track piece 186, the trolley 110 then rolls from the switch track 182 onto the track piece 186. After the trolley has left the switch track 182, the switch track is returned to its original position by a counterweight disclosed in my above-mentioned patent.

The drop switch mechanisms for operating the switch tracks 182 and 184 have oppositely directed threads 230 so that the switch tracks 182 will rotate in a counterclockwise direction and the switch tracks 184 will rotate in a clockwise direction in operation. It is also to be noted that the switch nearest the wall 198 will be provided with a relatively short latch pin 238 while the rearmost switch mechanism will be provided with a relatively long latch pin 238 and the lower ends of the remaining latch pins will terminate on a line connecting the front and rear latch pins. This permits the lug 244 on a carrier 110 to be adjusted in elevation so as to selectively operate any of the switch mechanisms desired.

The track pieces comprising the side track sections 194 and 196 are connected together by a plurality of straight pivoted track pieces 252 as illustrated in FIGURES 8 and 10–12. As shown in FIGURES 11 and 12, each of the pivoted track pieces 252 is connected by a hinge 254 to the forward end of one of the straight pieces comprising the track sections 194 and 196. For example, as shown in FIGURES 11 and 12, the piece 252 is connected by hinge 254 to the forward end of the straight track piece 202. The adjacent ends of the pieces 202 and 252 are beveled so as to form an angle therebetween of approximately 90°. A rigid arm 256 is connected to the rear end of the pivoted piece 252 and extends rearwardly beyond hinge 254 adjacent one side of the piece 202. The rear end of arm 256 is provided with a relatively heavy counterweight 258 so that the weight normally urges piece 252 upwardly as shown in FIGURE 11 until it is stopped by the abutting ends of the pieces 202 and 252.

In a similar manner, the radially outer ends of the laterally extending track pieces such as 186, see FIGURE 10, are connected by hinges 260 to one end of an arcuate track piece 262. The track piece 262 illustrated in FIGURES 10–12 has a forward end adapted to communicate with the rear end of the track piece 200. A rigid arm 264 is secured to the central portion of the arcuate track piece 262 and extends beyond the hinge 260. A counterweight 266 is secured to the free end of the arm 264, and since the adjacent ends of the arcuate track piece 262 and the supporting track piece 186 are beveled to form a V-shaped groove therebetween, the counterweight 266 pivots track piece 262 upwardly on hinge 260 to the position shown in FIGURE 12. Each side of the rear end of the stationary track piece 200 is provided with a short plate 268 which projects rearwardly and is adapted to support the forward ends of either of the pivoted track pieces 252 or 262 when they are pivoted downwardly on the plates.

One of the latch plates 268 has secured thereto a hollow rectangular latch housing 270 which slidably supports a latch pin 272 having a free beveled end. The pieces 252 and 262 have hollow latch receptacles 274 and 276 secured to their undersides so as to receive the latch pin 272 when the pivoted track pieces are in operative position. Latch pin 272 is normally urged out of the housing 270 by spring means, not shown. A slot is provided in the bottom of the housing 270 through which a vertical pin 278 extends, and the upper end of which is secured to the latch pin 272. A cable or rope 280 is secured at one end to the pin 278 and is guided over a pulley 282 secured to an ear fixed to the housing 270. The lowermost end of the rope 280 is provided with a loop 282 which may be suspended over a recess 284 in the floor of the building 154. A cable hook 286 is secured in the bottom of the recess 284 and normally the latch pin 272 is maintained retracted in inoperative position within the housing 270 by having the loop 282 engaged with an adjacent hook 286.

In operating the track system 164, it is first decided what portion of the building is first to be filled and the adjustable studs 244 on the trolleys are adjusted accordingly. For example, if it is first desired to fill the left rear portion of the building below the laterally extending track piece 188, the studs 244 are adjusted and locked in position so that they extend a relatively short distance above the axle 112. This adjustment causes the lugs 244 on the trolleys 110 to pass over all the switch tracks 182 and 184 without operating the switching mechanisms thereof except for the rearmost switch track 182. The trolleys are then guided onto the forward end of the leg extension 26' whereupon the chain 88' lifts the trolleys and the bales of hay thereon to the forward end of the track piece 168 in the same manner previously described. After each trolley has been elevated to the top of the leg extension 26', it separates from the pusher 124 on the chain 88' and moves by gravity towards the rear of the building. When the trolley passes onto the rearmost switch track 82, its lug 244 contacts the bottom of the latch pin 238 thereby releasing the latches 234 and 236 which permits the track section to drop downwardly and pivot 90° as previously described. The trolley and its load then is guided onto the upper end of the lateral track piece 188 and commences to roll down this piece. However, as can be seen in FIGURE 9, a pick-up arm 94 is mounted in operative position on all of the laterally extending track pieces. Consequently, when the trolley passes the pick-up arm 94 on the track piece 188, the bale of hay carried by the trolley is removed therefrom and dropped in the manner previously described. After the trolley has dumped its load, it then passes on down the track piece 188 and onto the L-shaped track piece 208. When the trolley reaches the forward end of the track piece 206, it rolls onto the rear end of one of the pivoted track pieces 252 and the weight of the trolley overcomes the force of the balance weight 258 thereby urging the track piece 252 onto the support plates 268 whereupon the trolley passes onto the track piece 200. After the trolley passes onto the section 200, the piece 252 is returned to its elevated position by the weight 258. The trolley is then urged forwardly on the track section 194 by gravity and passes over the remaining pivoted track sections 252 and onto the leg extension 216 whereupon it is returned to its starting position.

After the area of the building below the track piece 188 has been filled, another area of the building is selected for filling such as the area below the track piece 186. In this case, the lugs 244 on the trolleys are adjusted for operating the switching mechanism adjacent the upper end of the track piece 186. The trolleys are then conducted onto the track piece 186 in the same manner described above by the drop switch mechanism adjacent its end and its load is unhooked or disconnected by the pick-up arm 94 on the center of the track piece 186. After the empty trolley passes beyond the end of the track piece 186, it rolls onto the pivoted end of an adjacent arcuate track piece 262 whereupon the weight of the trolley forces the arcuate track piece to pivot to the position shown in FIGURE 11 so that the trolley may be conducted onto the side track section 194 and returned to its original position in a manner previously described.

In a similar manner, the remaining portions of the building may be filled with bales of hay or other substances, merely by selectively adjusting the lugs 244 on the carriers to the proper elevation.

When the rear portion of the building is being loaded, it is desired to release the cables 280 shown in FIGURE 12 from the hooks 286 so that the pivoted track pieces 252 will be locked in position once a trolley passes thereover. This permits the trolleys to operate at a faster rate since the pivoting of the track pieces 252 does obviously retard the speed of the trolleys to a certain extent.

As shown in FIGURE 8, there are six pivoted arcuate track pieces 262 and six straight pivoted track pieces 252. These are all of the same design and operate in the same manner.

When not in use, the forward portion of the track system 164 may be disconnected by means of the hooks 52' and 54' and then stored in the same manner as the forward portion of the track 10 shown in FIGURE 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A conveyor comprising a track, a carrier movable on and guided by the track, connecting means on the carrier for connecting it to a supporting member of a load, at least one load release means mounted adjacent said track and adapted to automatically engage and remove the supporting member from said connecting means when the carrier moves past said load release means on said track, said load release means being movably connected to said track whereby it may be selectively moved into and out of the path of movement of said load supporting member so that said load may be selectively disconnected from said connecting means or permitted to move past said load release means without being disconnected from said connecting means, said connecting means comprising a hook for extending under said supporting member and said load release means comprising an arm pivotally connected to said track and extending diagonally to the path of movement of said carrier when in load release position, said track defining an endless path, a first portion of said track being elevated and including support means for connecting it to the roof or ceiling of a building, a second portion extending downwardly from said first portion and connected at its lower end to a track loading portion, a rotatable means, an endless flexible member entrained around said rotatable means, drive means connected to said rotatable means for moving one part of said flexible member from said loading portion to the upper end of said second portion, connector means on said flexible member adapted to engage said carrier and move it from said loading portion to the upper end of said second portion whereby the carrier and flexible means automatically disconnect at the top of said second portion, said first portion sloping downwardly from the upper end of said second portion whereby the carrier and its load are moved by gravity to said hook, said connector means comprising a driving lug pivotally connected to said flexible member and a projection on said carrier drivingly engaged by said lug, said projection including a support plate extending under said lug and supporting and preventing sagging of said flexible member.

2. A conveyor of the type including an endless track with a carrier movably and guidably mounted thereon, said track havng an elevating portion inclining upwardly from a loading station to a high point and a descending portion continuously inclining downwardly from said high point back to said loading station whereby carriers will move by gravity from the former to the latter, elevating means associated with said track elevating portion and releasably engaged with said carriers and moving the latter from said loading station to said high point, connecting means on said carrier detachably engaging and supporting therebeneath a supporting member of a load, a load release means including a support fixedly mounted upon said track and a release arm pivoted upon said support, said release arm being movable between a raised inoperative position above said track and a lowered operative position in which its extremity is disposed in the path of movement of said connecting means and said load supporting member, said arm when in its lowered operative position inclining from its extremity upwardly and forwardly of said path of movement and being so positioned that said load supporting member will be engaged by said extremity and by its momentum will slide forwardly upon said arm and be thereby lifted and disengaged from said connecting means and then dropped by gravity from the extremity of said inclined arm, a coupling means detachably connecting asid carrier to said elevating means and propelling said carrier up said elevating portion comprising cooperating components respectively secured to said elevating means and said carriage, said components having cooperating thrust transmitting abutting surfaces, said elevating means component being also supported by said carrier component.

3. The combination of claim 2 wherein said elevating means component includes a coupling device allowing freedom of turning movement about two mutually perpendicular axes.

4. The combination of claim 3 including spring means connected to said coupling device.

5. A conveyor of the type including an endless track with a carrier movably and guidably mounted thereon, said track having an elevating portion inclining upwardly from a loading station to a high point and a descending portion continuously inclining downwardly from said high point back to said loading station whereby carriers will move by gravity from the former to the latter, elevating means associated with said track elevating portion and releasably engaged with said carriers and moving the latter from said loading station to said high point, connecting means on said carrier detachably engaging and supporting therebeneath a supporting member of a load, a load release means including a support fixedly mounted upon said track and a release arm pivoted upon said support, said release arm being movable between a raised inoperative position above said track and a lowered operative position in which its extremity is disposed in the path of movement of said connecting means and said load supporting member, said arm when in its lowered operative position inclining from its extremity upwardly and forwardly of said path of movement and being so positioned that said load supporting member will be engaged by said extremity and by its momentum will slide upwardly upon said arm and be thereby lifted and disengaged from said connecting means and then dropped by gravity from the extremity of said inclined arm, a pusher bracket secured to said elevating means and movable therewith, a driven bracket secured to said carrier and movable therewith, cooperating engageable thrust surfaces on said brackets, said surfaces having a pivoting connection comprising a cylindrical tongue and groove.

6. The combination of claim 5 wherein said elevating means bracket includes a pair of members pivotally connected for movement about an axis which is perpendicular to that of said pivoting connection.

7. A conveyor comprising an endless track including an upwardly inclined elevating portion and a downwardly inclined delivery portion with a lower loading portion and an upper discharge portion respectively connecting the lower and upper ends of said elevating portion to said delivery portion,
- a carrier movably and guidably mounted upon said track and having a hook depending therefrom for carrying a load supporting member,
- an endless flexible elevating member mounted upon said elevating portion and having operating means connected thereto for positively impelling a carrier from said loading portion to said discharge portion,
- said carrier traversing said delivery portion solely under the influence of gravity from said discharge portion to said loading portion,
- a disengageable pivoting connector having a portion pivotally secured to said elevating member and a portion secured to said carrier and establishing a fixed but releasable and pivoting attachment of said carrier to said elevating member between said loading and discharge portions only,
- a plurality of load release means fixedly mounted in longitudinally spaced positions upon said delivery portion,
- each load release means comprising an arm,
- means hingedly mounting said arm upon said track for manually operable swinging movement between an idle position above said track and an operative position extending beneath said track and with said arm located in the path of movement of said hook,
- said arm having a stationary, upwardly inclined lifting surface on which a load supporting member carried by said hook is adapted to slide by its forward momentum and be lifted thereby and disengaged from said hook, and from which said load supporting member subsequently drops by gravity after said forward momentum has been arrested.

8. The combination of claim 7 wherein the adjacent upper and lower ends of said elevating and delivery portions are each provided with releasable cooperating hook means detachably connecting said portions.

9. The combination of claim 7 wherein said portion of the pivoting connector secured to the elevating member constitutes a driving element and said portion of the pivoting connector secured to the carrier constitutes a driven element,
- a lug pivotally mounted on said driving element and having a cylindrical socket, said driven element having an enlargement slidable axially into and from said socket and being pivotally movable therein.

10. The combination of claim 9 wherein said driven element and said lug have cooperating abutment surfaces limiting relative pivoting movement in one direction.

11. The combination of claim 9 wherein said driving element and lug have cooperating abutment surfaces limiting relative pivoting therebetween.

12. The combination of claim 11 including a spring connected to said lug and to said driving member and yieldingly urging them for pivotal movement with their abutment surfaces in engagement.

13. The combination of claim 9 wherein said driving and driven elements are rigidly secured to and project laterally from said elevating member and said hook respectively.

References Cited by the Examiner

UNITED STATES PATENTS

| | | | |
|---|---|---|---|
| 746,737 | 12/03 | Olson et al. | 104—91 |
| 1,775,545 | 9/30 | Anderson | 104—88 X |
| 2,318,180 | 5/43 | Morse | 104—88 |
| 2,529,663 | 11/50 | Robinson | 104—172 X |
| 3,022,745 | 2/62 | Roberts | 104—99 |
| 3,047,126 | 7/62 | Ebner | 198—68 |
| 3,056,360 | 10/62 | Burmeister et al. | 104—102 X |
| 3,118,531 | 1/64 | Rutkovsky et al. | 198—38 |

FOREIGN PATENTS 791,276   2/58   Great Britain.

SAMUEL F. COLEMAN, *Primary Examiner.*

JULIUS E. WEST, *Examiner.*